UNITED STATES PATENT OFFICE.

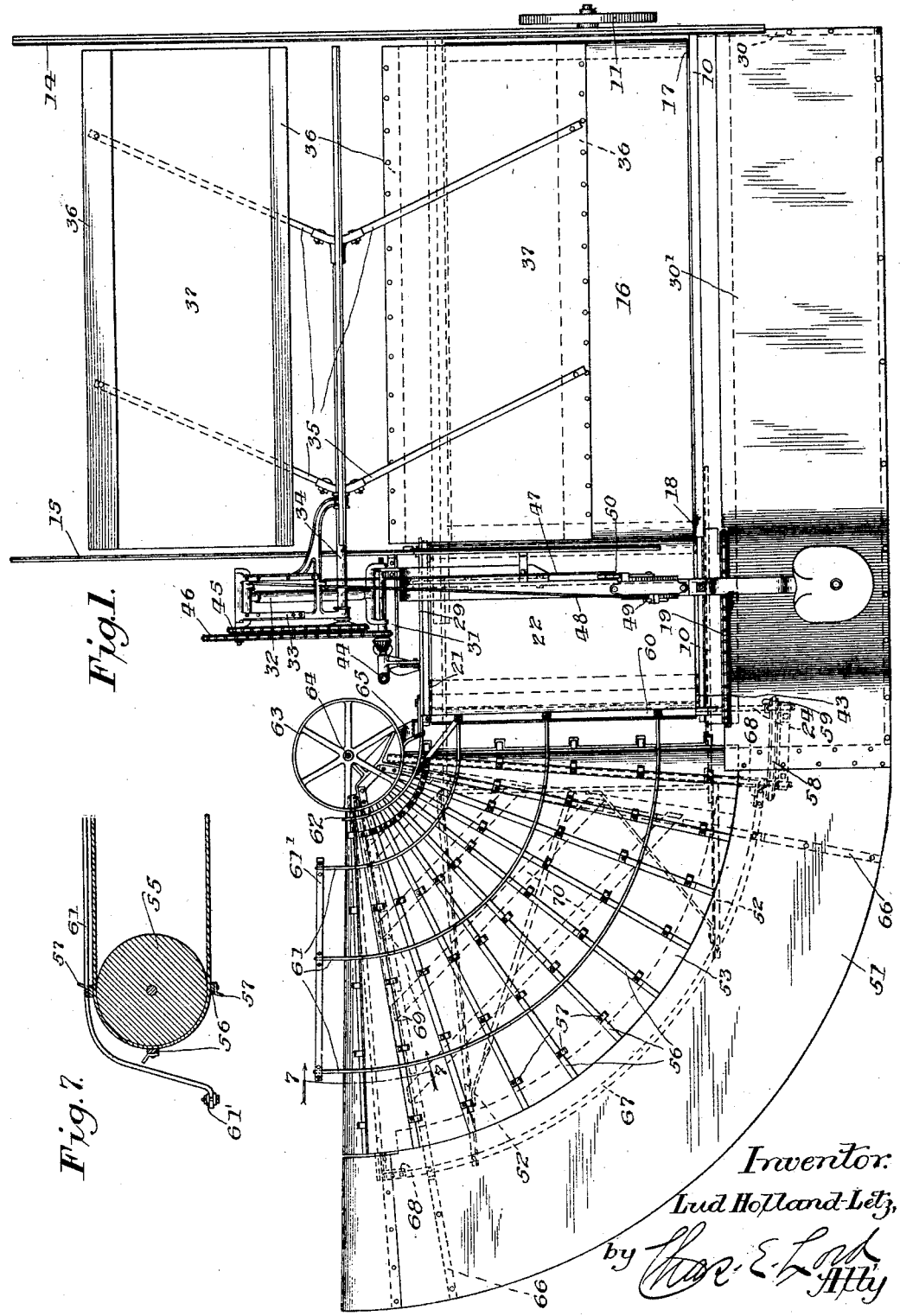

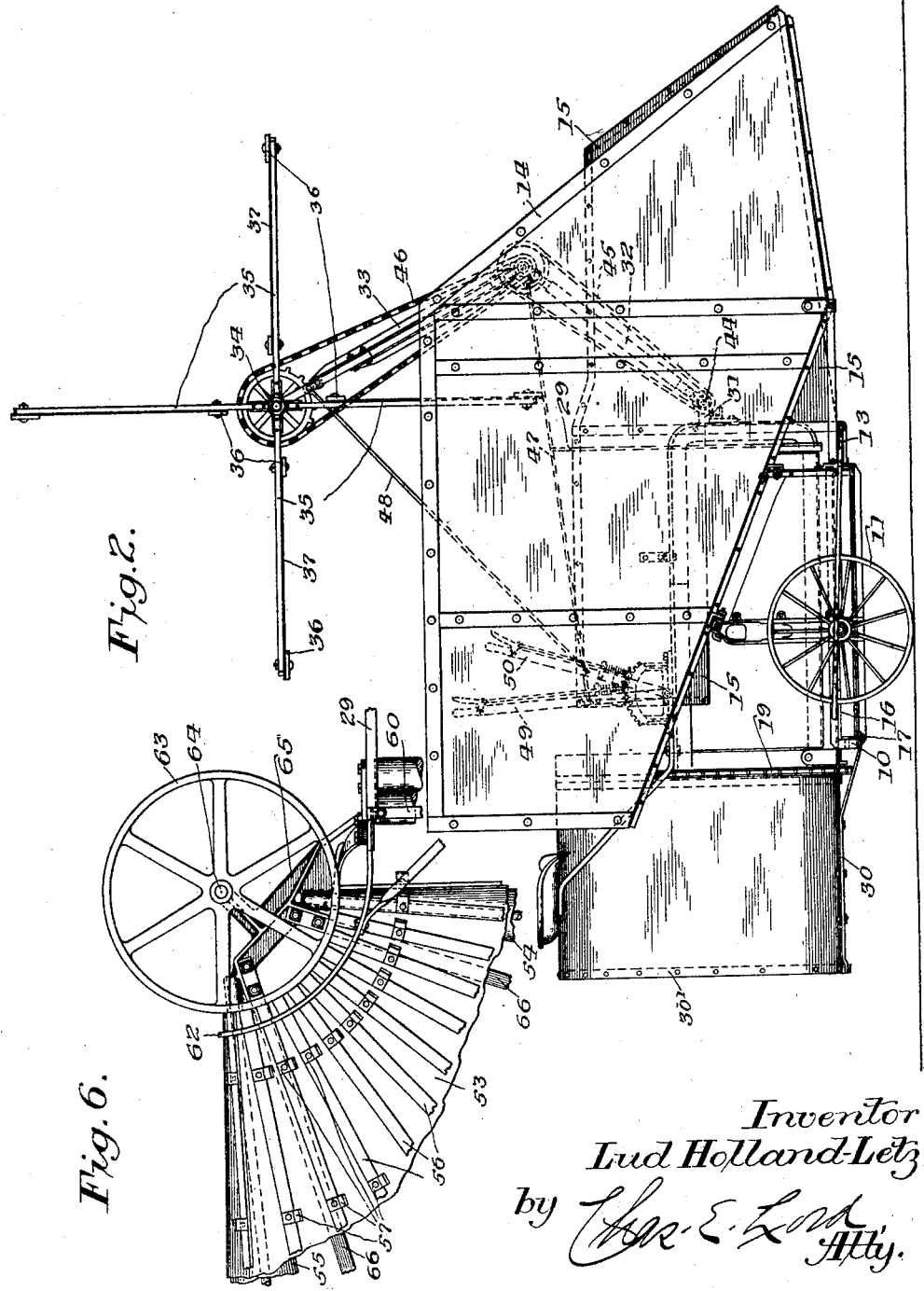

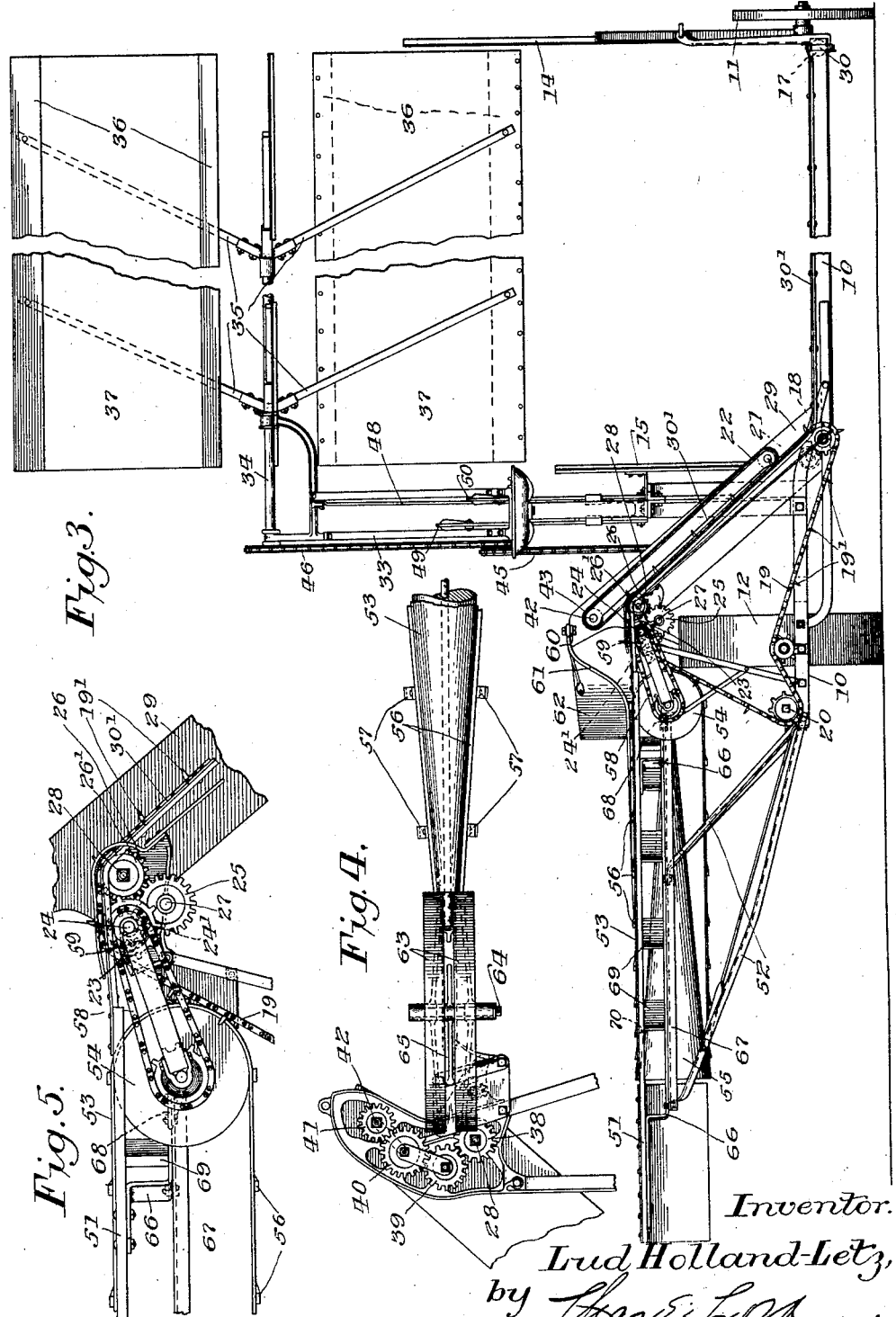

LUD HOLLAND-LETZ, OF OAK PARK, ILLINOIS, ASSIGNOR, BY MESNE ASSIGNMENTS, TO INTERNATIONAL HARVESTER COMPANY, A CORPORATION OF NEW JERSEY.

HEMP HARVESTING AND SPREADING MACHINE.

1,385,917.   Specification of Letters Patent.   Patented July 26, 1921.

Application filed May 31, 1917. Serial No. 172,065.

*To all whom it may concern:*

Be it known that I, LUD HOLLAND-LETZ, a citizen of the United States, residing at Oak Park, in the county of Cook and State of Illinois, have invented certain new and useful Improvements in Hemp Harvesting and Spreading Machines, of which the following is a full, clear, and exact specification.

My invention relates to hemp harvesting and spreading machines.

In the culture of hemp it is necessary that the hemp be spread uniformly on the field in order that the retting process may take place and the hemp may be uniformly retted in such a manner as to be readily broken in the hemp brakes to prepare the fiber for the market. It is also essential that the hemp be delivered with the stalks in parallel relation in order that the same may be gathered easily after being retted and be conveyed to the hemp brakes.

In gathering hemp stalks either by hand or by machine, the butts of the stalks are lifted first, since the butts are much heavier than the heads and the stalk is most easily manipulated by lifting it butt first. It is well known that the length of the various stalks of hemp in a single field varies greatly and it is not uncommon to have stalks ranging from two or three to twelve or fifteen feet in length, in a single field. As the cutter employed in the harvesting and spreading machines is usually seven or eight feet in length, it is obvious that certain of the stalks in any one row will overlap the stalks in the adjacent row after the hemp has been spread on the field, and in view of the fact that it is necessary for efficient gathering to lift the stalks butt first, it is equally necessary that the top layer of hemp, that is, the hemp in the last row spread on the field, shall have the butts projecting beyond the stalks which are overlapped by this top layer in order that the butts may be engaged by the lifting mechanism. By following through the operation of a hemp harvester and spreader in the field, it will be seen that in order to have the heads of the hemp in each row overlap the butts in the adjacent row thereby leaving the butts of the last row spread projecting between the stalks of the next adjacent row, it is necessary that the hemp be deposited on the field from the machine with the heads projecting inwardly, that is, toward the cutting apparatus and standing hemp. If the hemp is deposited at the rear of the machine, the butts of each row will overlap the heads of the adjacent row and this will not leave the butts of the top row, or row last spread, projecting beyond the stalks of the adjacent row.

The object of the invention is to meet the conditions set forth and solve the problems enumerated by spreading the hemp in a uniform layer in the field with the stalks in parallel relation and with the projecting heads of the long stalks in each row overlapping the butts of the stalks in the adjacent row.

With this object in view, my invention consists in a machine for cutting, elevating, conveying and delivering the hemp to the field in a uniform layer and with the stalks in parallel relation and with the projecting heads of the long stalks in each row overlapping the butts of the stalks in the adjacent row.

One embodiment of my invention is illustrated in the accompanying drawings, and in these drawings—

Figure 1 is a top plan view of my harvester and spreader;

Fig. 2 is a side elevation of the machine;

Fig. 3 is a rear elevation of the same;

Fig. 4 is an enlarged detail of the gearing for driving the conveyer mechanism and of the bearing sheaves or pulleys for the inner end of the quadrantal conveyer;

Fig. 5 is a rear view on an enlarged scale of the gearing for the elevating conveyers and for the driving pulley for the quadrantal conveyer;

Fig. 6 is an enlarged plan view of the inner portion of the quadrantal conveyer showing the inner edge of the conveyer in bearing relation with respect to the bearing sheaves or pulleys; and Fig. 7 is a detail view taken on line 7—7 of Fig. 1.

The cutting and elevating mechanism of my machine is substantially the same as that of the ordinary grain harvester and comprises the usual platform frame 10 supported on a wheel 11 and bull wheel 12 and carrying at its front end the usual reciprocating cutting apparatus 13. This frame is also provided with dividers 14 and 15 and platform conveyer 16 carried by rolls 17 and 18, the roll 18 being driven by chain 19, which in turn is driven from a shaft 20 connected by suitable driving connections with the bull wheel 12. The chain 19 is provided with a plurality of lugs 19' for a purpose hereinafter described. The usual elevating conveyers 21 and 22 are supported by the harvester frame, the conveyer 21 also being driven by the chain 19 through a sprocket wheel 23 carried on a shaft 24 and intermeshing gears 24', 25 and 26 carried by shafts 24, 27 and 28. The gear 26 is provided with a laterally extending drum 26' for supporting and guiding the chain 19. The shaft 28 carries the upper roller of the roller conveyer 21 and constitutes the driving roller for this conveyer.

The harvester frame supports at its front end the usual elevator plate 29 and at its rear end, in conjunction with an extension 30 of the platform frame, supports an upwardly and laterally extending sheet metal supporting plate 30'. This plate 30' supports the upward run of chain 19 and the rear ends of the hemp stalks after they are cut by the cutting apparatus and as they are being elevated by the conveyers 21 and 22 and lugs 19' on chain 19 to the upper platform hereinafter described.

The harvester is also provided with the usual reel supporting bracket 31 which carries a lower reel frame 32, to which is pivoted an upper reel frame 33 carrying the reel shaft 34, to which are attached the reel arms 35. These arms 35 support cross arms 36, which in turn carry webs or wings 37 formed of canvas or other suitable material. The front end of the shaft 28 carries a gear 38 connected by means of idlers 39 and 40 with a gear 41 carried by a shaft 42, which carries the upper driving roller 43 for the outer elevating conveyer 22. The front end of shaft 27 is connected by suitable gearing in the usual manner to the drive shaft 44, which in turn is connected by driving chains 45 and 46 to the reel shaft 34. The lower and upper reel frames 32 and 33 are connected by means of rods 47 and 48 to adjusting levers 49 and 50, by means of which the reel may be elevated and shifted fore and aft of the machine in the usual manner.

After the hemp which has been cut is conveyed by the platform conveyer 16 and elevated by the conveyers 21 and 22, it is deposited on an arcuate delivery platform 51 supported by suitable braces 52 carried by the platform frame 10 and supporting the platform in a manner hereinafter described. This delivery platform in turn supports the outer edge portion of the quadrantal delivery conveyer 53 carried by the conical driving rollers 54 and 55. The conveyer is preferably formed of canvas and carries radial slats 56 preferably made of wood and provided with upstanding metallic lugs 57 which assist in maintaining the hemp in proper relation and in a uniform layer and in feeding the same forwardly for delivery at the front of the machine. The conical roller 54 is driven by means of a chain 58 connected with a sprocket wheel 59 carried by the shaft 24, the shaft 24 being driven by connections hereinafter described.

The elevator plate 29 carries a rearwardly and longitudinally extending metallic strip or bar 60 which supports at its inner end a series of concentric rods 61. These rods 61 at their forward ends extend over and below the delivery conveyer 53 and roller 55, are curved outwardly beyond the periphery of said roller and are connected by a strip 61'. The rods normally rest of their own weight on the conveyer 53, which in turn is supported by the delivery platform 51. The purpose of these rods is to press the hemp downwardly on the conveyer 53, thereby maintaining the same in a uniform layer between the lugs 57 and insuring the delivery of the stalks in a parallel relation from the front of the platform and the conveyer 53. The arcuate rods also prevent the hemp from being thrown outward by centrifugal force.

The supporting bar 60 also carries a shield 62 against which the inner ends of the stalks abut as they are being conveyed around the quadrantal platform prior to their delivery. The inner ends of the slats 56 of the upper and lower laps of the conveyer 53 have their end thrust taken up by the sheaves or pulleys 63 carried by a vertical shaft 64 supported on the bracket 65 bolted to the main frame of the harvester. It will be seen that as the conveyer revolves around the rollers 54 and 55, the slats of the upper and lower laps will be thrust against the bearing sheaves or pulleys 63, which will be rotated by the conveyer and will form a bearing for taking up the end thrust of the conveyer. The bracket 65 also carries radial brace bars 66, which in turn carry near their outer ends an angle brace 67, the curvature of which conforms to an arc drawn with shaft 64 as a center. The opposite ends of the bar 67 carry journal brackets 68 for the outer ends of the shafts of the conical rollers 54 and 55.

Secured to the strips 66 are a plurality of blocks 69 which carry on their upper surfaces supporting bars 70 for the apron or delivery conveyer 53. The outer portion of the conveyer 53 is supported, as shown in Fig. 1, by the arcuate platform 51 and the inner portion of the conveyer is carried and supported by the cross bars 70.

In the operation of the device, the hemp is cut by the cutting apparatus 13, is conveyed laterally on the platform conveyer 16, elevated by the elevating conveyers 21 and 22 to the upper platform 51, and delivered to the conveyer 53. The butts of the hemp, as it is deposited on the delivery conveyer, abut against the shield 62, the outer ends of the hemp resting on the portion of the platform 51 extending beyond the conveyer 53. As fast as the hemp reaches the conveyer 53, it is brought into contact with the upstanding lugs 57 carried by the slats on the conveyer and is carried around the quadrantal platform, being maintained in a uniform layer, with the stalks disposed radially, by the pressure of the rods 61 and with the butts converging and the heads diverging. As it reaches the front of the platfrom, it is guided in its downward path by the front ends of these rods and is deposited in parallel relation upon the field with the butts disposed inwardly toward the cutting mechanism and standing hemp.

From the above description it will be seen that I have provided a machine for cutting and delivering the hemp whereby the same is handled in a simple and efficient manner and is delivered to the field in a uniform layer and with the stalks in parallel relation and with the heads of the long stalks overlapping the butts of the stalks in the adjacent row, in which relation they can be easily gathered and conveyed to the hemp brakes after the retting process has been completed.

While I have in the above specification described one embodiment which my invention may assume in practice, it will be understood that various modifications may be employed without departing from the spirit of the invention as expressed by the following claims.

What I claim as new is:

1. In a hemp harvester and spreader, means for cutting, conveying and spreading the hemp on the ground with the stalks parallel to each other and transverse to the line of draft, the stalk engaging surfaces of said conveying means being substantially flat, and means for compressing the hemp as it is being conveyed to insure a uniform spreading of the same, said means comprising a plurality of curved rods, the free ends of which are connected together.

2. In a hemp harvester and spreader including cutting and conveying mechanism, means for delivering the hemp at the front of the harvester and means coöperating with said delivering means for compressing the hemp as said hemp is being conveyed and insuring a uniform spreading of the same.

3. In a hemp harvester including cutting and conveying mechanism, means including a quadrantal conveyer for delivering hemp, the hemp-engaging surface of said quadrantal conveyer being substantially flat, and rods coöperating with said quadrantal conveyer, whereby the free ends of said rod may rise and fall for compressing the hemp and maintaining the same in a uniform layer.

4. In a hemp harvester including cutting and conveying mechanism, means including a quadrantal conveyer for delivering hemp at the front of the harvester, and compressing means supported at one end on the harvester and resting on said quadrantal conveyer to compress the hemp and maintain the same in a uniform layer.

5. In a hemp harvester, cutting mechanism, a platform conveyer receiving the hemp from said cutting mechanism, a quadrantal delivery conveyer receiving the hemp from said platform conveyer and having a substantially flat hemp engaging surface, and a series of concentric rods the free ends of which are connected together and coöperate with said conveyer for holding the hemp firmly in place thereon.

6. In a hemp harvester, cutting apparatus, conveyer mechanism receiving the hemp from said cutting apparatus, delivery mechanism coöperating with said conveyer mechanism and operative to deliver the hemp at the front of the machine and transverse to the line of draft, and means coöperating with said delivery mechanism to compress the hemp and prevent movement thereof relative to said delivery mechanism.

7. In a hemp harvester, cutting mechanism, and means including an endless quadrantal conveyer for positively delivering the hemp at the front of the machine and transverse to the line of draft.

8. In a hemp harvester, cutting mechanism, means including a quadrantal conveyer for delivering the hemp, and means supported on the harvester and resting on said quadrantal conveyer and extending downwardly beyond the delivery end thereof for retaining the hemp in position on said conveyer as said hemp is being delivered.

9. In a hemp harvester, cutting mechanism, a positively operating conveyer for discharging the hemp from the harvester with the butts disposed inwardly, and means coöperating with said conveyer for retaining the hemp against displacement with respect to said conveyer before it reaches discharging position, said means deflecting the hemp vertically from the delivery end of said conveyer.

10. In a hemp harvester, cutting mechanism, a conveyer for discharging the hemp from the harvester, and means extending around the delivery lap of said conveyer and downwardly beyond the same for compressing and retaining the same on the conveyer and guiding it as it is discharged.

11. In a hemp harvester, a frame cutting mechanism carried thereby, and means movable on said frame for positively delivering the hemp at the front of the machine with the stalks substantially parallel to each other and disposed transverse to the line of draft.

12. In a hemp harvester, cutting mechanism, and positively actuated means for delivering the hemp at the front of the machine with the stalks substantially parallel to each other and disposed transverse to the line of draft, said delivering means having a substantially flat hemp engaging surface.

13. In a hemp harvester, cutting mechanism, and endless conveying means for positively delivering the cut stalks substantially parallel to each other and at the front of the harvester with their butts disposed inwardly toward the standing hemp.

14. In a hemp harvester, cutting mechanism, and endless conveying means for positively conveying the stalks at the front of the harvester through a quadrant with the butts converging and the heads diverging.

In testimony whereof I affix my signature.

LUD HOLLAND-LETZ.